(12) United States Patent
Du

(10) Patent No.: US 10,921,627 B2
(45) Date of Patent: Feb. 16, 2021

(54) METHODS OF MANUFACTURING DISPLAY PANELS AND DISPLAY PANELS

(71) Applicant: Yungu (Gu'an) Technology Co., Ltd., Langfang (CN)

(72) Inventor: Yang Du, Langfang (CN)

(*) Notice: Subject to any disclaimer, the term of this patent is extended or adjusted under 35 U.S.C. 154(b) by 0 days.

(21) Appl. No.: 16/420,196

(22) Filed: May 23, 2019

(65) Prior Publication Data
US 2019/0278128 A1 Sep. 12, 2019

Related U.S. Application Data

(63) Continuation of application No. PCT/CN2018/113505, filed on Nov. 1, 2018.

(30) Foreign Application Priority Data

May 2, 2018 (CN) .......................... 201810410286.9

(51) Int. Cl.
*H01L 21/00* (2006.01)
*G02F 1/1333* (2006.01)
*G02F 1/1337* (2006.01)

(52) U.S. Cl.
CPC .. *G02F 1/133351* (2013.01); *G02F 1/133308* (2013.01); *G02F 1/133723* (2013.01); *G02F 1/133311* (2021.01)

(58) Field of Classification Search
CPC ......... G02F 1/133351; G02F 1/133308; G02F 1/133723
See application file for complete search history.

(56) References Cited

U.S. PATENT DOCUMENTS 10,741,590 B2 * 8/2020 Yamazaki ................ G09F 9/00

FOREIGN PATENT DOCUMENTS

| CN | 103676377 A | 3/2014 |
|---|---|---|
| CN | 15137658 A | 12/2015 |
| CN | 107742476 A | 2/2018 |
| CN | 108710234 A | 10/2018 |
| JP | 2003043476 A | 2/2003 |

(Continued)

OTHER PUBLICATIONS

Partial translation of CN 107742476, 2020.*

(Continued)

*Primary Examiner* — Richard A Booth
(74) *Attorney, Agent, or Firm* — Kilpatrick Townsend & Stockton

(57) ABSTRACT

Exemplary embodiments of the present disclosure relate to methods of manufacturing display panels and display panels. The method of manufacturing a display panel includes: preparing a driving film layer on a substrate of the display panel, and removing at least a removal part of the driving film layer along a slotting-cutting path of the display panel; performing a cutting process on a slotted area of the display panel along the slotting-cutting path. By removing at least a removal part of the driving film layer along the slotting-cutting path before performing the cutting process on the slotted area of the display panel, problems such as thermal damage to the driving film layer and the like can be prevented, so that the problem of reducing the strength of the screen body in the slotted area can be avoided, and the quality of the product can be improved.

10 Claims, 3 Drawing Sheets

(56) References Cited

FOREIGN PATENT DOCUMENTS

| KR | 20060081587 A | 7/2006 |
| KR | 20100137744 A | 12/2010 |
| WO | 2010007713 A1 | 1/2010 |
| WO | 2015085733 A1 | 6/2015 |

OTHER PUBLICATIONS

CN First Office Action with First Search Report dated Apr. 26, 2019 in the corresponding CN application (application No. 201810410286.9).

* cited by examiner

METHODS OF MANUFACTURING DISPLAY PANELS AND DISPLAY PANELS

CROSS-REFERENCES TO RELATED APPLICATIONS

The present application is a continuation application of International Application No. PCT/CN2018/113505, filed on Nov. 1, 2018, and claims priority to China Application No. 201810410286.9, filed on May 2, 2018, entitled METHODS OF MANUFACTURING DISPLAY PANELS AND DISPLAY PANELS. The entireties of these applications are incorporated by reference herein for all purposes.

FIELD

Exemplary embodiments of the present disclosure relate to display technologies, and more particularly, to methods of manufacturing display panels and display panels.

BACKGROUND

With the development of display technology, the size of display screen of mobile terminals is getting larger and larger. With the rapid development of the market demand and touch technology, the display terminal with a full screen has gradually become the mainstream product in the market, but in order to reserve the location for the parts such as the front-facing camera, the telephone receiver and the like, it is necessary to slot in a display area of the screen to maintain the functions of front camera shooting, face unlock and the like.

SUMMARY

In view of the above, exemplary embodiments of the present disclosure provide methods of manufacturing display panels and display panels capable of improving product quality for addressing the above technical problems.

According to an aspect of the present disclosure, it is provided a method of manufacturing a display panel, and the method includes:

providing a driving film layer on a substrate of the display panel; removing at least a removal part of driving film layer along a slotting-cutting path of the display panel; and performing a cutting process on a slotted area of the display panel along the slotting-cutting path.

In an embodiment, the method further includes:

providing the PI film layer on the substrate of the display panel, and removing at least a removal part of the PI film layer along the slotting-cutting path of the display panel.

In an embodiment further including providing an array film layer on the display panel where at least a removal part of the PI film layer along the slotting-cutting path has been removed.

In an embodiment, a width of the removal part of the PI film is greater than a width of the slotting-cutting path.

In an embodiment, the driving film layer includes the PI film layer and the array film layer, and the method further includes:

providing the PI film layer and the array film layer on the substrate of the display panel, and removing at least a removal part of the PI film layer and the array film layer along the slotting-cutting path of the display panel.

In an embodiment, the width of the removal part of the PI film and a width of the removal part of the array film layer are the same as a width of the slotting-cutting path.

In an embodiment, after providing the driving film layer on the substrate of the display panel and removing at least a removal part of the driving film layer along the slotting-cutting path of the display panel, and before performing the cutting process on the slotted area of the display panel along the slotting-cutting path, further including:

providing a protective layer on the display panel where at least a removal part of the drive film layer along the slotting-cutting path has been removed.

In an embodiment, after providing the array film layer on the display panel where at least a removal part of the PI film layer along the slotting-cutting path has been removed, a protective layer is provided on the display panel where the array film layer has been provided.

In an embodiment, after providing the PI film layer and the array film layer on the substrate of the display panel and removing at least a removal part of the PI film layer and the array film layer along the slotting-cutting path, a protective layer is provided on the display panel.

In an embodiment, the protective layer is a CVD sputtered inorganic layer or an organic layer.

In an embodiment, the cutting process on the slotted area of the display panel along the slotting-cutting path includes performing a laser-cutting or a cutter wheel-cutting or a CNC machine grinding on the slotted area of the display panel along the slotting-cutting path.

In an embodiment, a width of the removal part of the driving film layer is greater than the width of the cutting path on the display panel.

In an embodiment, width of the removal part of the driving film layer is equal to the width of the cutting path on the display panel.

In an embodiment, the slotting-cutting path has a width of 0.8 mm to 1.2 mm.

According to another aspect of the present disclosure, it is provided a display panel manufactured by the above method of manufacturing a display panel.

In the above methods of manufacturing display panels and display panels, by providing the driving film layer on the substrate of the display panel and removing at least a removal part of the driving film layer along the slotting-cutting path of the display panel; by performing the cutting process on the slotted area of the display panel along the slotting-cutting path, and by removing at least a removal part of the driving film layer along the slotting-cutting path before performing the cutting process on the slotted area of the display panel, problems such as thermal damage to the driving film layer and the like can be prevented, so that the problem of reducing the strength of the screen body in the slotted area can be avoided, and the quality of the product can be improved.

DETAILED DESCRIPTION OF THE INVENTION

As explained above, it is often desirable to have a slot area on a display (e.g., a cell screen). However, a slotted area in a slotted display screen is cut into an irregular shaped area, and to improve use effect, the smaller the slotted area, the better. Because of the need for small angle arc cutting, stresses in the slotted area are different from those in the other display areas. Therefore, when cutting the slotted area, it is easy to cause problems such as cracks, etc. in the slotted area.

In conventional methods of manufacturing a display panel, firstly a base layer is formed on a substrate of the display screen, and then the base layer and the substrate are simultaneously cut by a method of laser-cutting. However, when it is slotted by the laser cutting, the base layer will be thermally damaged, resulting in a decrease in the strength of a screen body in the slotted area, so that there is a problem of low product quality.

Reference will be made to the drawings and embodiments to describe the present disclosure in detail, so that the objects, technical solutions and advantages of the present disclosure can be more apparent and understandable. It should be understood that the specific embodiments described herein are only used to explain the present disclosure and not intended to limit the present disclosure.

Methods of manufacturing display panels provided by exemplary embodiments of the present disclosure can be applied to the manufacture for display panels in various display products such as a smart phone, a tablet computer, a notebook computer, a displayer, a television, and the like. Methods of manufacturing display panels provided by exemplary embodiments of the present disclosure are mainly directed to a process flow for slotting on display panel to maintain the functions of the front camera shooting, the face unlock and the like in the manufacturing process for the display panel of the display terminal with full screen.

Figure 1:
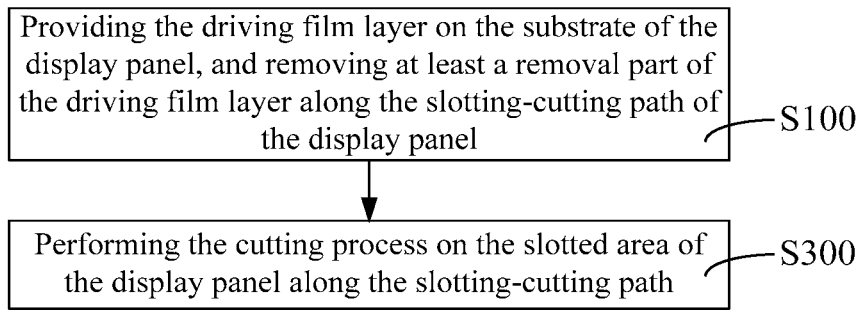
FIG. 1 is a schematic flow chart illustrating a method of manufacturing a display panel according to an embodiment of the present disclosure.

In an embodiment, as shown in FIG. 1, it is provided a method of manufacturing a display panel, the method includes the following steps:

In step S100, a driving film layer is provided on a substrate of the display panel, and at least a removal part of the driving film layer along a slotting-cutting path of the display panel is removed.

The substrate of the display panel may be a glass substrate or a substrate made of another material. Depending on the processing technology, the composition of the driving film layer is not the same, which is specifically determined by cutting process steps. The driving film layer may only include a PI (Polyimide) film layer or may include both the PI film layer and an array film layer.

Specifically, the driving film layer is provided on the entire surface of the substrate of the display panel, and then at least a removal part of the driving film layer along the slotting-cutting path of the display panel is removed, in which the slotting-cutting path is a contour path of the slotted area of the display panel. Before slotting the display panel, at least a removal part of the driving film layer along the cutting path of the slotted area is removed, specifically, by laser carbonization or non-laser means.

In step S300, the cutting process is performed on the slotted area of the display panel along the slotting-cutting path.

After removing at least a removal part of the driving film layer along the cutting path of the slotted area, the cutting is performed on the slotted area of the display panel. In an embodiment, Laser-cutting, cutter wheel-cutting or CNC machine grinding are performed on the slotted area of the display panel along the slotting-cutting path. The cutting mode is not unique, which specifically determined by the processing environment and product requirements. After removing at least a removal part of the driving film layer along the cutting path of the slotted area, the cutting path after removing at least a removal part of the driving film layer remains on the display panel, and a width of the removal part of the driving film layer may be greater than or equal to the width of the cutting path on the display panel. By cutting and slotting along the cutting path on the display panel, the problem of thermal damage to the drive film layer in the slotted area can be avoided.

In the above method of manufacturing a display panel, by providing the driving film layer on the substrate of the display panel and removing at least a removal part of the driving film layer along the slotting-cutting path of the display panel; by performing the cutting process on the slotted area of the display panel along the slotting-cutting path, and by removing at least a removal part of the driving film layer along the slotting-cutting path before performing the cutting process on the slotted area of the display panel, problems such as thermal damage to the driving film layer and the like can be prevented, so that the problem of reducing the strength of the screen body in the slotted area can be avoided, and the quality of the product can be improved.

Figure 2:
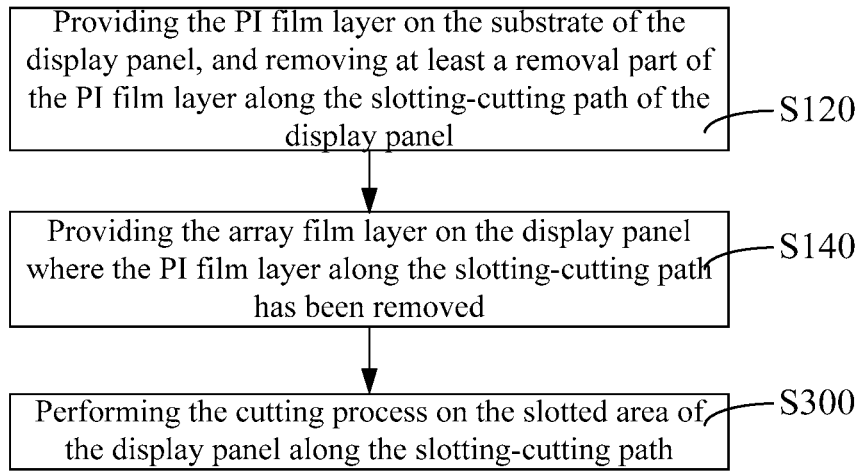
FIG. 2 is a schematic flow chart illustrating a method of manufacturing a display panel according to another embodiment of the present disclosure.

In an embodiment, as shown in FIG. 2, the drive film layer includes the PI film layer, and step S100 includes step S120.

In step S120, the PI film layer is provided on the substrate of the display panel, and at least a removal part of the PI film layer along the slotting-cutting path of the display panel is removed.

The driving film layer includes the PI film layer. After providing the PI film layer on the substrate of the display panel, the PI film layer forms a base layer of the display panel. PI is a kind of polymer with high temperature resistant, which is the most used base material in the current display panel manufacturing. After removing at least a removal part of the PI film layer along the slotting-cutting path of the display panel, other film layer lines can be normally provided, and after providing the other film layer lines, the cutting process is performed on the slotted area of the display panel along the slotting-cutting path. At this time, a width of the removal part of the PI film layer may be determined by the number and thickness of other film layers to be provided.

In an embodiment, as shown in FIG. 2, after step S120, it further includes step S140.

In step S140, the array film layer is provided on the display panel where at least a removal part of the PI film layer along the slotting-cutting path has been removed.

After removing at least a removal part of the PI film layer along the slotting-cutting path, the array film layer that used for connecting the drive module is provided on the display panel where at least a removal part of the PI film layer along the slotting-cutting path has been removed. After providing the array film layer, the cutting process is performed on the slotted area of the display panel along the slotting-cutting path. In an embodiment, if there is further a need to provide the array film layer on the display panel after removing at least a removal part of the PI film layer along the slotting-cutting path, a width of the removal part of the PI film layer is greater than a width of the slotting-cutting path, That is, the width of the slotting-cutting path of the display panel where the manufacturing process of removing at least a removal part of the PI film layer and providing the array film layer has been performed is greater than or equal to the width of the slotting-cutting path required for actual production, so that the subsequent slotting process can be performed normally, and the quality of the product is improved.

It can be understood that if other film layer needs to be provided on the display panel, after removing at least a removal part of the PI film layer along the slotting-cutting path, the other film layers are normally provided on the display panel where at least a removal part of the PI film layer along the slotting-cutting path has been removed. After the preparation of the other film layers is completed, the cutting process is performed on the slotted area of the display panel along the slotting-cutting path. If there is further a need to provide other film layers on the display panel after removing at least a removal part of the PI film layer along the slotting-cutting path, the width of the removal part of the PI film layer needs to be recalculated according to the number and thickness of the other film layers to be provided, so that the width of the slotting-cutting path of the display panel where the manufacturing process of removing at least a removal part of the PI film layer and providing the array film layer has been performed is greater than or equal to the width of the slotting-cutting path required for actual production. When the width of the removal part of the PI film layer satisfies the above requirements, the subsequent slotting process can be performed normally to ensure that the produced display panel meets the production requirements.

Figure 3:
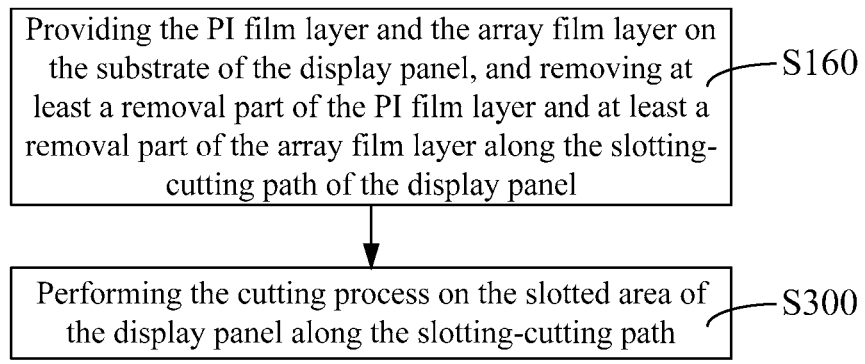
FIG. 3 is a schematic flow chart illustrating a method of manufacturing a display panel according to still another embodiment of the present disclosure.

In an embodiment, as shown in FIG. 3, the driving film layer includes the PI film layer and the array film layer, and step S100 further includes step S160.

In step S160, the PI film layer and the array film layer are provided on the substrate of the display panel, and at least a removal part of the PI film layer and the array film layer along the slotting-cutting path of the display panel are removed.

Specifically, if the driving film layer includes the PI film layer and the array film layer, firstly the PI film layer and the array film layer are provided on the substrate of the display panel, and then, after at least a removal part of the PI film layer and the array film layer along the slotting-cutting path of the display panel are simultaneously removed, the cutting process is performed on the slotted area of the display panel along the slotting-cutting path. Further, when providing the PI film layer and the array film layer on the substrate of the display panel, the PI film layer is provided first, and then the array film layer is provided. In an embodiment, a width of the removal part of the PI film and a width of the removal part of the array film layer are the same as a width of the slotting-cutting path, that is, when removing at least a removal part of the PI film layer and the array film layer, the width of the removal part is the same as the width of the slotting-cutting path of the display panel. When the width of the removal part of the PI film layer and the array film layer satisfy the above requirements, the subsequent slotting process can be performed normally to ensure that the produced display panel meets the production requirements, and the product quality can be improved.

Figure 4:
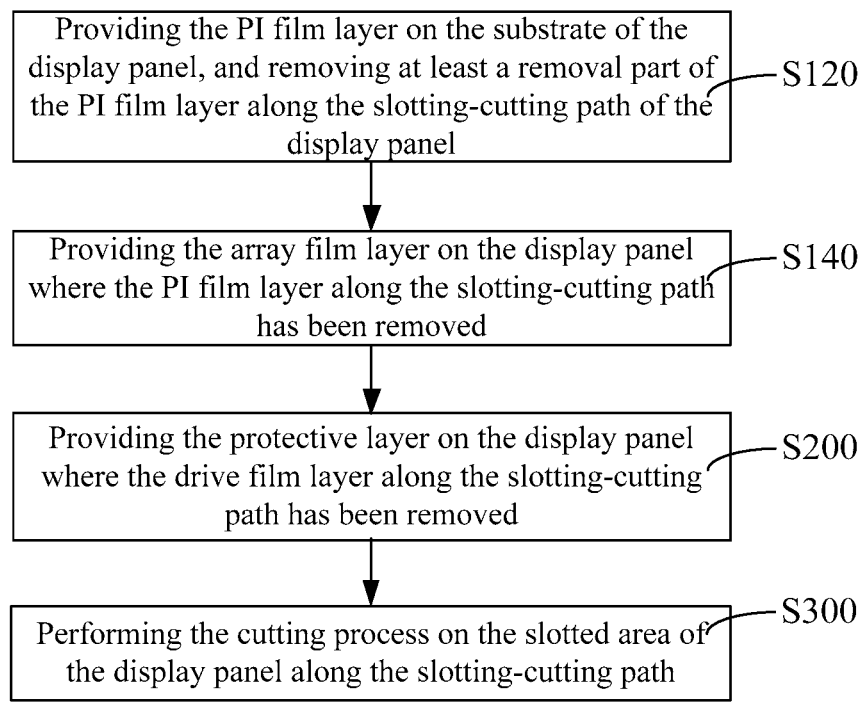
FIG. 4 is a schematic flow chart illustrating a method of manufacturing a display panel according to still another embodiment of the present disclosure.

In an embodiment, as shown in FIG. 4, step S200 is further included after step S100 and before step S300.

In step S200, a protective layer is provided on the display panel where at least a removal part of the drive film layer along the slotting-cutting path has been removed.

After removing at least a removal part of the driving film layer along the slotting-cutting path of the display panel, the driving film layer in a cutting line area is exposed, which tends to cause problems such as oxidation, corrosion and the like. Therefore, after removing at least a removal part of the driving film layer along the slotting-cutting path, the protective layer is provided on the display panel to protect the driving film layer in the exposed state in the cutting line area. Specifically, the provided protective layer may be a CVD (Chemical Vapor Deposition) sputtered inorganic layer or a provided organic layer.

In an embodiment, if the driving film layer includes the PI film layer, as shown in FIG. 4, after the array film layer is provided on the display panel where at least a removal part of the PI film layer along the slotting-cutting path has been removed, the protective layer is provided on the display panel where the array film layer has been provided to prevent the array film layer in the exposed state in the cutting line area from problems such as oxidation, corrosion, and the like. After providing the protective layer, the cutting process is performed on the slotted area of the display panel along the slotting-cutting path to ensure that the produced display panel meets the production requirements.

Figure 5:
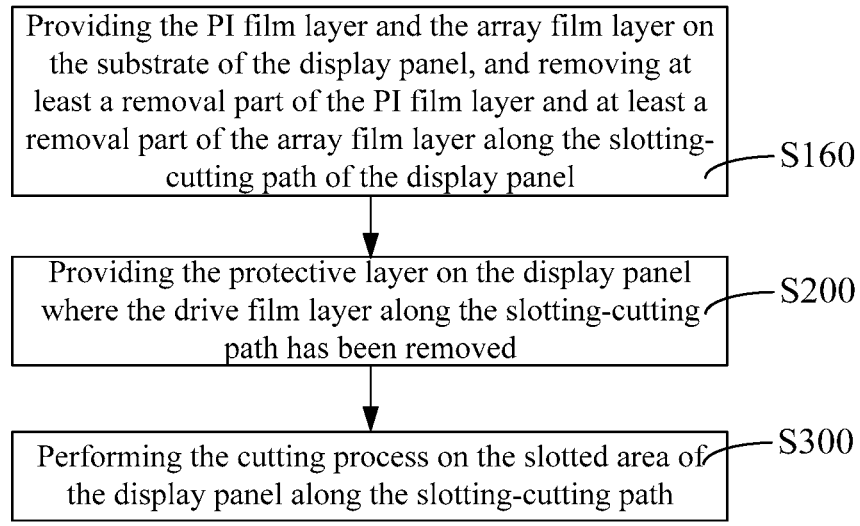
FIG. 5 is a schematic flow chart illustrating a method of manufacturing a display panel according to still another embodiment of the present disclosure.

In an embodiment, if the driving film layer includes the PI film layer and the array film layer, as shown in FIG. 5, after removing at least a removal part of the PI film layer and the array film layer along the slotting-cutting path of the display panel, and before the cutting process is performed on the slotted area of the display panel along the slotting-cutting path, the protective layer is provided on the display panel to prevent the PI film layer and the array film layer in the exposed state in the cutting line area from problems such as oxidation, corrosion, and the like. After providing the protective layer, the cutting process is performed on the slotted area of the display panel along the slotting-cutting path to ensure that the produced display panel meets the production requirements.

Figure 6:
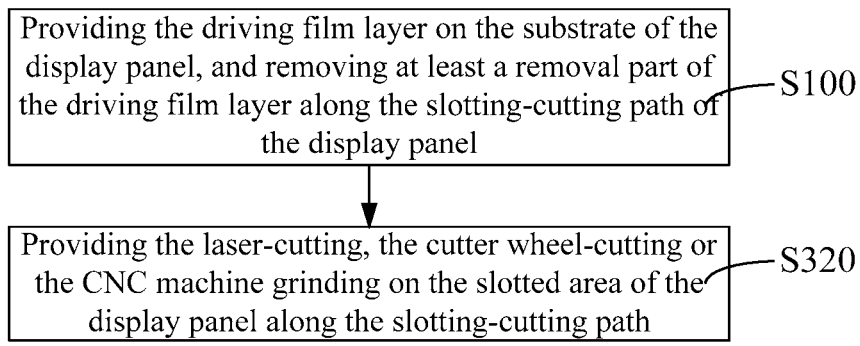
FIG. 6 is a schematic flow chart illustrating a method of manufacturing a display panel according to still another embodiment of the present disclosure.

In an embodiment, as shown in FIG. 6, step S300 includes step S320.

In the step S320, the laser-cutting, the cutter wheel-cutting or the CNC machine grinding is performed on the slotted area of the display panel along the slotting-cutting path.

Specifically, when the cutting process is performed on the slotted area of the display panel along the slotting-cutting path, the slotted area can be cut by the laser-cutting, or the slotted area can be cut by the methods such as cutter wheel-cutting or CNC machine grinding and the like. Cutting the slotted area by non-laser cutting method can prevent the thin film encapsulation layer from being damaged by the high-energy laser, and a narrower border of the slotted area of the display panel can be achieved, so that the product quality can be further improved.

In an embodiment, a width of the slotting-cutting path that is a width of the removal part when removing at least a removal part of the PI film layer or the width of the removal part when removing at least a removal part of the PI film layer and the array film layer ranges from 0.8 mm to 1.2 mm. The width of the slotting-cutting path may be 0.8 mm, 0.9 mm, 1 mm or 1.2 mm, and the particular width may be determined according to the number and thickness of the other film lines to be provided after removing at least a removal part of the PI film layer or removing at least a removal part of the PI film layer and the array film layer. The width of the slotting-cutting path may be equal to or slightly larger than the cutting width of the screen body that is the cutting width when the cutting process is performed on the slotted area of the display panel along the slotting-cutting path, and it can further avoid damage to the thin film encapsulation layer when cutting the slotted area, and the narrower border of the slotted area can be achieved.

In an embodiment, it is provided a display panel manufactured by the above method. Manufacturing the display panel by the above method can reduce damage to the driving film layer by the slotted area, and the operation reliability of the manufactured display panel is higher, and the quality of the display panel is improved.

The above display panel can be obtained by providing the driving film layer on the substrate of the display panel and removing at least a removal part of the driving film layer along the slotting-cutting path of the display panel; and by performing the cutting process on the slotted area of the display panel along the slotting-cutting path. By removing at least a removal part of the driving film layer along the slotting-cutting path before performing the cutting process on the slotted area of the display panel, problems such as thermal damage to the driving film layer and the like can be prevented, so that the problem of reducing the strength of the screen body in the slotted area can be avoided, and the quality of the product can be improved. The operation reliability of the display panel manufactured by the above method is higher.

It should be understood that although the various steps in the flowchart of FIGS. 1-6 are sequentially displayed as indicated by the arrows, these steps are not necessarily performed in the order indicated by the arrows. Unless explicitly stated herein, the performing order of the steps is not be limited strictly, and the steps may be performed in other orders. Moreover, at least part of the steps in FIGS. 1-6 may comprise a plurality of sub-steps or phases, which are not necessary to be performed simultaneously, but may be performed at different times, and for the performing order thereof, it is not necessary to be performed sequentially, but may be performed by turns or alternately with other steps or sub-steps of other steps or at least part of the phases.

The technical features of the above-described embodiments may be combined arbitrarily. To simplify the description, all the possible combinations of the technical features in the above embodiments are not described. However, all of the combinations of these technical features should be considered as within the scope of the present disclosure, as long as such combinations do not contradict with each other.

The above-described embodiments merely represent several embodiments of the present disclosure, and the description thereof is more specific and detailed, but it should not be construed as limiting the scope of the present disclosure. It should be noted that, for a person skilled in the art, several variations and improvements may be made without departing from the concept of the present disclosure, and these are all within the protection scope of the present disclosure. Therefore, the protection scope of the present disclosure shall be subject to the appended claims.

The invention claimed is:

1. A method of manufacturing a display panel, comprising:
    providing a PI film layer on a substrate of the display panel, and
    removing at least a removal part of the PI film layer along a slotting-cutting path of the display panel, wherein a width of the removal part of the PI film is greater than a width of the slotting-cutting path;
    providing an array film layer on the display panel where the at least a removal part of the PI film layer along the slotting-cutting path has been removed; and
    performing a cutting process on a slotted area of the display panel along the slotting-cutting path.

2. The method of claim 1, wherein after providing the PI film layer on the substrate of the display panel, and before performing the cutting process on the slotted area of the display panel along the slotting-cutting path, further comprising:
    providing a protective layer on the display panel where at least a removal part of the PI film layer along the slotting-cutting path has been removed.

3. The method of claim 1, wherein after providing the array film layer on the display panel where at least a removal part of the PI film layer along the slotting-cutting path has been removed, a protective layer is provided on the display panel where the array film layer has been provided.

4. The method of claim 3, wherein the protective layer is a CVD sputtered inorganic layer or an organic layer.

5. The method of claim 1, wherein the cutting process on the slotted area of the display panel along the slotting-cutting path comprises performing a laser-cutting or a cutter wheel-cutting or a CNC machine grinding on the slotted area of the display panel along the slotting-cutting path.

6. The method of claim 1, wherein the slotting-cutting path has a width of 0.8 mm to 1.2 mm.

7. A display panel manufactured by the method of claim 1.

8. The display panel of claim 7, further comprising:
    a protective layer on the display panel where the at least a removal part of the PI film layer along the slotting-cutting path has been removed.

9. The display panel of claim 8, wherein the protective layer is a CVD sputtered inorganic layer or an organic layer.

10. The display panel of claim 7, wherein the slotting-cutting path has a width of 0.8 mm to 1.2 mm.

* * * * *